US009111239B2

(12) United States Patent  
Minert et al.

(10) Patent No.: US 9,111,239 B2
(45) Date of Patent: Aug. 18, 2015

(54) ACTIVITY RECORDING OF CONTACT HANDLING SYSTEM AGENTS (75) Inventors: Brian D. Minert, Orem, UT (US); David Peterson, Lehi, UT (US)

(73) Assignee: inContact, Inc., Midvale, UT (US)

( * ) Notice: Subject to any disclaimer, the term of this patent is extended or adjusted under 35 U.S.C. 154(b) by 298 days.

(21) Appl. No.: 13/182,328

(22) Filed: Jul. 13, 2011

(65) Prior Publication Data

US 2013/0016115 A1    Jan. 17, 2013

(51) Int. Cl.
G06Q 10/06 (2012.01)
G06T 1/00 (2006.01)
H04N 7/167 (2011.01)

(52) U.S. Cl.
CPC .............. *G06Q 10/06* (2013.01); *G06T 1/0021* (2013.01); *H04N 7/167* (2013.01)

(58) Field of Classification Search
None
See application file for complete search history.

(56) References Cited

U.S. PATENT DOCUMENTS 5,946,387 A * 8/1999 Miloslavsky ............ 379/265.12
6,154,576 A * 11/2000 Anderson et al. ............ 382/269
6,850,228 B1 * 2/2005 Parks et al. .................... 345/173
7,945,620 B2 * 5/2011 Bou-Ghannam et al. ...... 709/204
2002/0039191 A1 * 4/2002 Kinoshita ....................... 358/1.9
2005/0192853 A1 * 9/2005 Ebert et al. ......................... 705/7
2006/0028488 A1 * 2/2006 Gabay et al. .................. 345/626
2008/0163368 A1 * 7/2008 Harris et al. ..................... 726/21
2009/0092241 A1 * 4/2009 Minert et al. ............ 379/265.06
2009/0201538 A1 * 8/2009 Ishikawa et al. .............. 358/1.15
2009/0316996 A1 * 12/2009 Yokoi ........................... 382/199

OTHER PUBLICATIONS

Adobe Creative Team, "Replacing Colors in an Image in Adobe Photoshop CS4", Oct. 15, 2008.*

* cited by examiner

*Primary Examiner* — Aaron M Richer
(74) *Attorney, Agent, or Firm* — Maschoff Brennan (57) ABSTRACT

Methods and apparatus for recording agent activity and display information optionally redacting sensitive information from the recorded imagery prior to review by the agent's supervisor in a contact handling system are disclosed. The method can include recording image data displayed to the agent on a visual display during interaction by the agent with the contact media. The method can include audio recordings of what the agent heard and spoke that are combined with the recorded image data to simultaneously display the video and audio to a supervisor for quality assurance in the contact handling system. The method can further include modifying one or more selected pixels of the recorded image data to automatically exclude information from the recorded image data thereby creating redacted image data.

25 Claims, 6 Drawing Sheets

ACTIVITY RECORDING OF CONTACT HANDLING SYSTEM AGENTS

BACKGROUND OF THE INVENTION

1. The Field of the Invention

The present invention relates to the training and monitoring of agents in a contact handling system. More specifically, the invention relates to methods and apparatus for recording agent activity and display information while optionally redacting sensitive information from the recorded imagery prior to review by the agent's supervisor.

2. The Relevant Technology

An important activity in managing a contact handling system, such as a call center, regards the monitoring of agents for evaluation and training purposes. It is important that agents handle their assigned contacts in a proficient and accurate manner, and while so doing behave in a way that will enhance the business relationship with the customers in contact with the system. To this end, agent activities are often recorded for later assessment and feedback, a process often referred to in the call center industry as quality assurance.

Contacts come in a variety of media types (calls, faxes, emails, chats, SMS, etc.), and typically require multiple computer display windows with which the agent must interact with the customer during the course of handling the contact. The ability to review an agents' screen activity is important, and the ability to review the audio of any contact-related phone conversation is of paramount importance as well. Where video chat is involved, the video recordings of both the agent and the customer are beneficial.

The subject matter claimed herein is not limited to embodiments that solve any disadvantages or that operate only in environments such as those described above. Rather, this background is only provided to illustrate one exemplary technology area where some embodiments described herein may be practiced

BRIEF SUMMARY OF THE INVENTION

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Embodiments disclosed herein relate to a method for redacting selected image data that is later used for monitoring the activity of an agent responding to contact media in a contact handling system. The method can include recording image data displayed to the agent on a visual display during interaction by the agent with the contact media. The method can further include modifying one or more selected pixels of the recorded image data to automatically exclude information from the recorded image data thereby creating redacted image data.

The contact handling system can include a media server, which handles connection paths for contact media. The contact handling system can further include an automatic contact distributor, which tracks the state of each contact and agent, supplying idle agents with waiting contact media. The contact handling system can further include an interactive voice response unit, which provides pre-recorded audio prompts to incoming voice contact media. The contact handling system can further include storage for storing redacted data received from the agent workstation along with other electronic files.

The contact handling system can further include a contact handling network connected to telephony and/or outside packet-based network.

A contact handling system is also disclosed that includes an agent workstation. The agent workstation includes an electronic processor and a computer readable medium having executable instructions stored thereon. The computer executable instructions are configured to perform the method, including recording image data displayed to the agent on a visual display during interaction by an agent with contact media and modifying one or more selected pixels of the recorded image data to automatically exclude information from the recorded image data thereby creating redacted image data.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

to FIG. 3 illustrates a graphical user interface for an agent;

FIG. 4 illustrates a display recording for the supervisor where sensitive information has been redacted;

DETAILED DESCRIPTION OF THE PREFERRED EMBODIMENTS

1. Examples of Problems in the Relevant Art

Currently there are companies that supply products that address parts of this market. Often they supply only one aspect of interest, such as agent screen recording. They may also supply means of interfacing with other aspects such as recorded audio, but it is often encumbered by high complexity, disjointed data, and problems with synchronizing the disparate media types.

On agent computer screens, confidential data may appear within business application windows that are often restricted by policy or regulation from being recorded and stored by the call center. Examples include social security numbers, financial information, and other examples of sensitive data and details that are preferably not reproduced for the supervisor's review according to the Inventors' teachings herein. However, solutions for excluding this data and fields from screen recordings may generally not be offered by screen-recording vendors.

Modern contact-handling systems can also be "cloud-based" where an off-premises internet-connected provider supplies and manages the bulk of the computing equipment and hardware. These provide, among other things, the myriad routing, storage, reporting and agent interface functions of a call center, often referred to in traditional terms as automatic call distributors (ACD) and interactive voice response (IVR) units. Cloud-based solutions enable agents to process contacts with nothing more than a computer, a telephone and an internet connection. Current providers of agent recording often require on-premises equipment which is expensive, requires expertise to maintain and operate, and eliminates coverage of at-home agents—an area of ever-increasing importance for businesses to reduce costs and promote environmental responsibility.

Voice recordings are also a special challenge. Many systems have no integration between telephony audio and screen activity. As examples, calls may be answered, put on hold, transferred, conference, or originated during the course of a contact. Intimate knowledge of the contact state and media connectivity is generally necessary to include the requisite audio with the associated screen activity in the agent contact recording.

2. Examples of Components of Contact-Handling Systems

Figure 1:
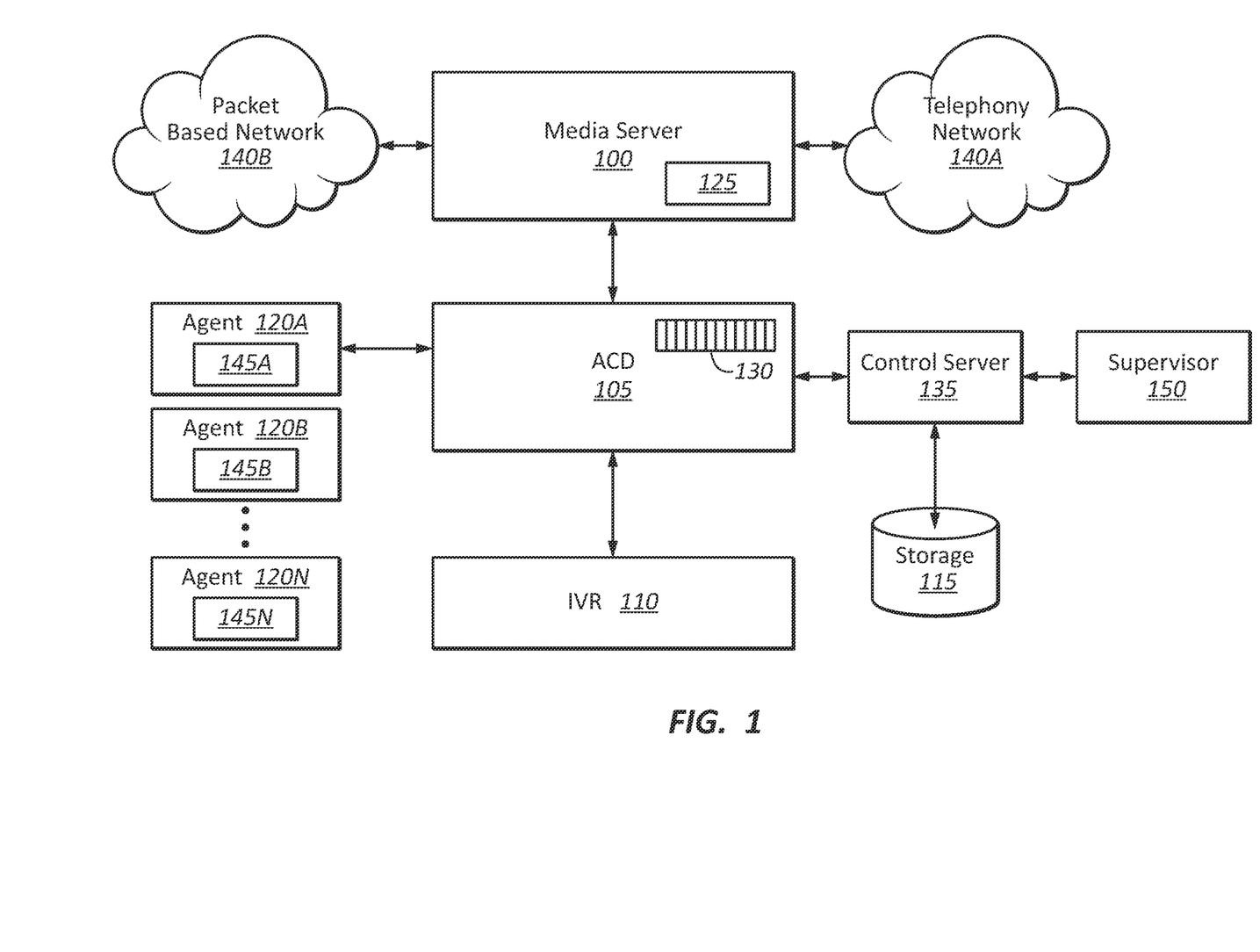
FIG. 1 illustrates an example of a contact handling system according to one embodiment of the Applicant's invention.

FIG. 1 illustrates an example of a contact handling system according to one embodiment of the Applicant's invention. Components of the contact-handling system can include media server(s) 100, an automatic contact (or call) distributor (ACD) 105, an interactive voice response (IVR) unit 110, storage 115, agent workstations 120A-Z (collectively referenced as "120"), and contact networks 140A and B (collectively "140), for example.

The media server(s) 100 handle the connection paths for phone calls and optionally additional contact media 125 types such as fax, conferencing, video conferencing, etc. Media recordings can take place in the media server 100. Media servers 100 can include the traditional telephony PBX (Private Branch eXchange), computer servers handling internet telephony traffic (Voice over Internet Protocol, or VoIP), voice gateways, etc.

The ACD component 105 can track the state of each contact 130 and agent 120A-N (collectively "120"), supplying idle agents 120 with waiting contacts 130. Most contacts 130 have traditionally been phone calls, and the ACD controls the routing of calls and other media to/from agents 120.

IVR units 110 can be used as the first stage of handling an incoming call. The process usually starts by playing pre-recorded audio prompts (e.g. menu selection choices), and accepting handset touch-tone key presses or Automatic Speech Recognition (ASR) to navigate a menu system to supply automated information (such as business address, hours of operation, etc.) or be routed to an agent 120 via the ACD 105.

Storage 115 can include organized computer disk drives as databases and files. Recordings of phone calls, chat sessions and other interactions with customers may be stored on the storage 115 for later reference or review. Many aspects of call center activity can be recorded and stored in the storage 115, which are later retrieved by a supervisor for use in reporting and handling of agent interaction and training.

Media server(s) 100, ACD 105, IVR(s) 110 and storage 115 are often referred to as "back office" equipment, referring to restricted-access supervisor 150 and control computers 135 located in server rooms at the contact handling system where these types of equipment are traditionally installed and operated. Functional lines between them are often blurred, meaning that there are various solutions which may combine or distribute the functions of these servers and storage. For example, certain IVR functions can be done in media gateways.

Agent workstations 120 often include traditional desktop computers and phones. Agent workstations can also include more-portable electronics such as laptop computers, netbooks, internet-capable phones or tablets for call center agents to interact with customers and contact media. Software running on these devices typically includes business applications (which will be referred to later) and programs to interface with the contact-handling system, but may extend to programs which can make recordings of what the agent can see on the screen(s) according to the invention disclosed herein.

Network connections to traditional telephony 140A and/or packet-based networks 140B are generally needed to receive contacts 130 of the various media types, and otherwise interconnect the ACD 105 to the other elements of the contact-handling system.

The location of media servers 100, ACD 105 and storage 115 are traditionally at the physical location of the contact handling system representing the business. As previously mentioned, more recently, these "on-premises" solutions can be supplemented, or replaced, by "cloud-based" systems, where the media servers 100, ACD 105 and/or storage 115 may be operated far from the traditional call center, and use longer network connections to deliver call center functionality to agents 120, be it at home or at more-traditional call center facilities. In addition, cloud-based solutions can provide a multi-business hosting model, where various businesses are delivered call center functionality via cloud-based equipment which is shared among the businesses, with appropriate safeguards for privacy and data security.

3. Examples of Display Image Recording and Information Redaction Algorithms

According to the teachings disclosed herein, media streams can be recorded along with screen activity of an agent, where the media streams and agent recording can advantageously be exported into a single output file for review by a supervisor and/or storage 115. Collectively, this "agent recording" seeks to provide a complete representation of the customer experience during the course of the contact, and thus allow for an effective review of the agents' performance and the effective formulation of feedback, additional training, and corrective action. Advantageously, this would be available to the reviewer as a network-delivered movie, for example, with sensitive data selectively and automatically redacted from the movie.

In some embodiments, software 145A-N (collectively "145") installed on the agent workstation (the "screen recorder") does the screen recording. When instructed by the ACD 105, the screen recorder 145 records the screen information and outputs the results to the media server 100 that is processing the media (e.g. phone call) for the contact. The screen recorder 145 output may be compressed. The screen recorder 145 output may be secured during transmission via a secure transport facility (e.g. Secure Sockets Layer) or by encrypting the data prior to being shipped (via AES, DES, RSA, Blowfish, MD-5, etc.), for example.

The ACD 105 can direct the use of all media streams within all media servers 100 and has an intimate knowledge of the agent 120 states and contact 130 states. The ACD 105 can therefore direct the media server 100 to associate one or more media events or streams with a given contact 130 and agent 120.

When instructed by the ACD 105, the media server 100 saves the screen recorder 120 stream data and the data from the one or more media streams associated with the contact 130 and agent 120. The media server 100, or other contact handling system component, can combine the data from all streams into a single output file either progressively or after the ACD 105 has stopped the agent recording for the contact 130. The ACD 105 can also specify intermediate changes of media stream, allowing the media server 100 to record the proper combinations of media streams in the midst of dynamic events such as on/off hold, conferencing, transfers, etc. The final output file including the screen recording and other media files can be compressed and encrypted, if desired.

The ACD 105 may perform the starting and stopping of agent recording in response to commands from the supervisor 150, a rule-based selection criterion (e.g. every 10th call) configured for the ACD 105 by the supervisor 150, a logic function within a script, or based on some other criteria or schedule.

According to the teachings disclosed herein selected image data is redacted in the screen recording that is later used for monitoring the activity of an agent responding to contact media so as to exclude the presentation of sensitive data to the supervisor 150 that was displayed for a particular agent 120.

For example, the screen recorder 145 can record image data, such as image data representing what is displayed to an agent 120 on a computer monitor during interaction by the agent with contact media, such as during interaction with a customer on the customer's telephone. One or more pixels of the image data recorded can be modified to automatically exclude information from the recorded image data thereby creating redacted image data.

Figure 2:
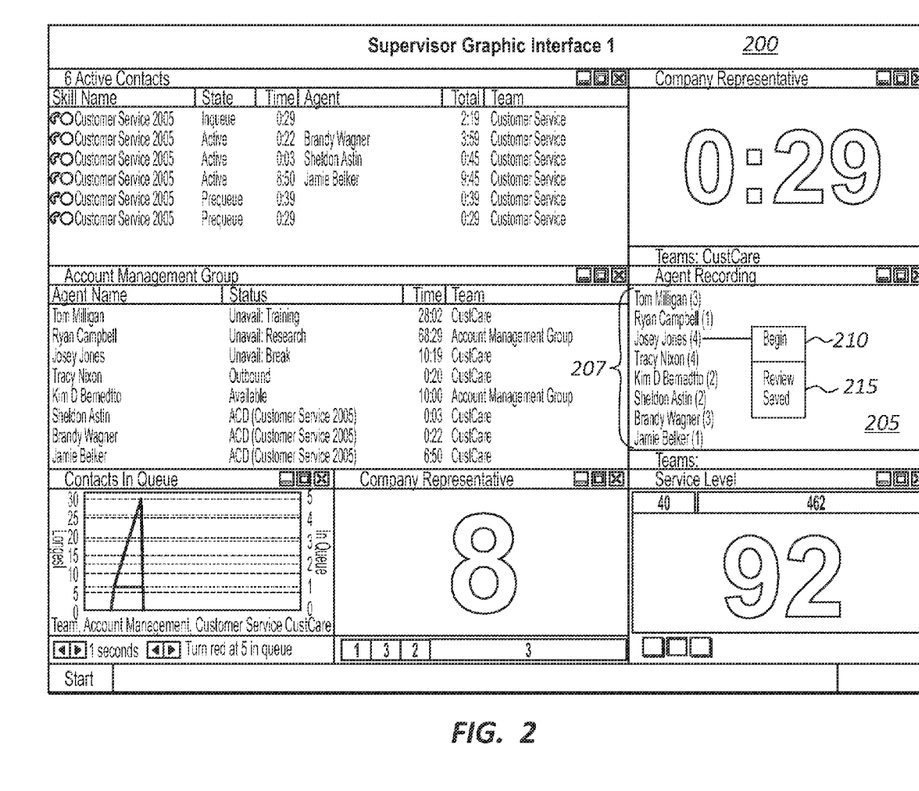
FIG. 2 discloses aspects of one example of a supervisor graphical interface.

For example, FIG. 2 discloses aspects of one example of a supervisor graphical interface that enables a supervisor to monitor and control the screen recording as well as monitor the activity of company representative agents. The supervisor graphical user interface can various display elements and windows which display information about the various agents handing contacts, their particular status, team, training, and level of service for the supervisor's review.

The supervisor graphical user interface can include an agent recording display element 205 that can list the various agents 207 as selectable tabs for initiating 210 and reviewing 215 recordings. Upon selecting an agent 207, the supervisor can be presented with the option of reviewing saved recordings 215, the number of saved recordings 215 can be indicated in parenthesis as shown, or to initiate a new recording 210. The saved recordings 215 can be acquired according to an algorithm, supervisor selectable setting, or in other manner. When a recording is initiated 210 the screen display and media streams of the agent interacting with the contact is recorded for the supervisor's review. The playback for the supervisor can be displayed in another window or an application that is used to display the screen recording on the supervisor's display. However, pixels within the screen recording are modified to redact certain information from the display to the supervisor.

Figure 3:
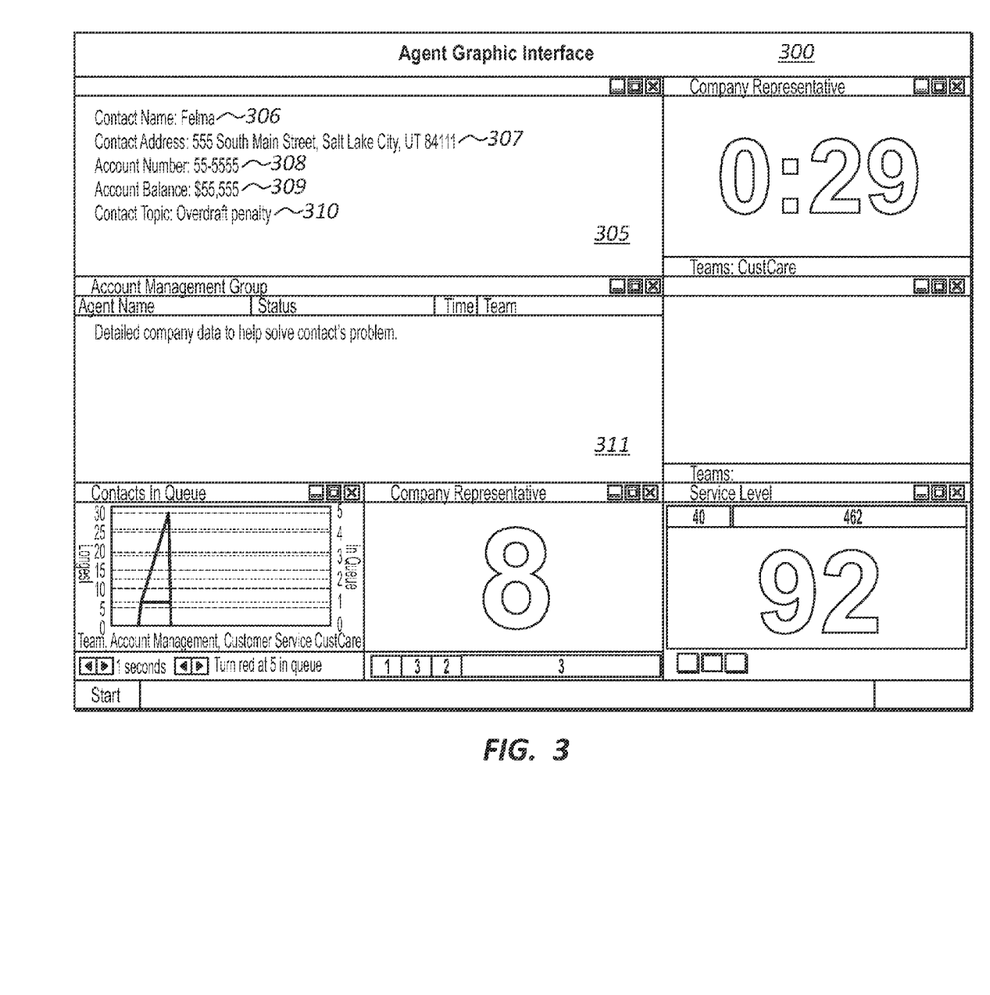

For example, referring to FIG. 3 a graphical user interface 300 for an agent is shown with various display elements to assist the agent in handling contacts and to obtain information about the particular customer that the agent is interacting with. As shown the display elements can include a display element 305 presenting information about the customer, such as the customer's name 306, address 307, account number 308, account balance 309, the contact category 310 related to the purpose of the contact media as well as a display element 311 for displaying helpful information for the agent to address the customer's inquiry.

As shown in FIG. 4, however, in a display recording 400 for the supervisor where sensitive information has been redacted. In this instance, the contact's account number 308 and balance 309 have been selectively and automatically redacted from the screen recording 400 such that they are not included in the playback to the supervisor.

Figure 5:
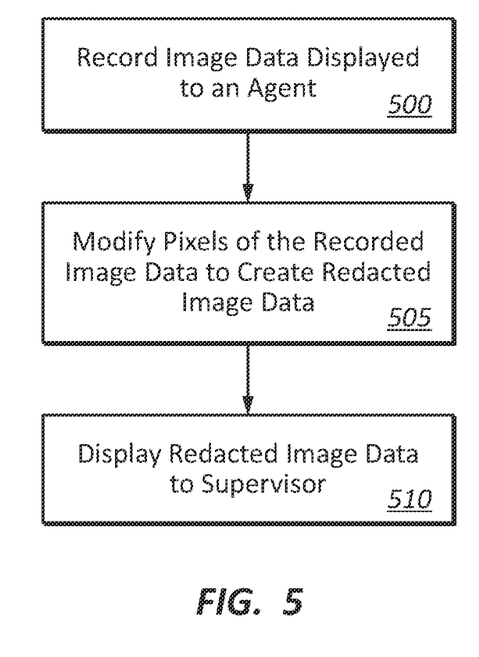
FIG. 5 illustrates a method for redacting selected image data for supervisor playback.

Referring to FIG. 5, a method for redacting selected image data for supervisor playback is shown. The method is performed in a contact handling system and is for monitoring the activity of an agent responding to contact media.

The method includes recording image data displayed to the agent on a visual display during interaction by the agent with the contact media (500) (e.g. see FIG. 3). The method further includes modifying one or more selected pixels of the recorded image data to automatically exclude information from the recorded image data thereby recreating redacted image data (505) (e.g. see FIG. 4).

In some embodiments, the screen recorder, e.g. at the agent's workstation, may be configured to obscure any screen content of a particular color value or values. For example, a color value is often represented as a concatenation of 3 8-bit bytes of red, green and blue intensity, often documented using hexadecimal notation. For example, in such a notation white is represented as 0xFFFFFF, green as 0x00FF00 and black as 0x000000. The screen recorder may be configured to exclude one or more selected color values either statically or at runtime. For example, the screen recorder may be configured with a list of selected colors, such as a list including 0x000100 and 000001 (both of which are very near to true black). The redaction can also be performed by a video player at the supervisor's work station or prior to, or after, storage of the video recording by a server or other computer.

According to a first method, one or more selected pixels of sensitive data can be modified based on color values by replacing single individual pixels. In the screen recording process, a snapshot of the pixel data can be taken at some time interval and the color values processed for compression and transmission or storage. Snapshot pixel data can be processed in raster scan order (left-to-right along each row, and top row to bottom row). If a selected one or more pixel color for exclusion is 0xFF0000 (bright red) and a bright red color value is found anywhere snapshot, the pixel color value can be replaced by the previous color value in the snapshot (or a specified color value).

By the use of this method, horizontal runs of bright red color values are all replaced by the previous color value in the snapshot. Thus, for example, a bright red area in a field of green will be rendered as a field entirely of green. According to a practical example, all off-black text in a field of white will essentially disappear when recorded.

Pixels of a selected color for exclusion may be either foreground colors or background. And, many algorithms may be used to achieve the same result (substitute the color value above, for example), all covered by the basic concept of replacing selected color values with other colors in order to obscure details in the playback that were present during the initial capture. A further advantage of replacing foreground color values to the predominant background color (or viceversa) should be noted in that video compression ratios increase for areas of solid color.

According to a second method for redacting selected image data that is later used for monitoring the activity of an agent responding to contact media, selected color values are modified along with one or more additional adjacent pixels. This method can have particular advantages in circumstances such as with anti-aliased fonts. Anti-aliasing techniques seek to smooth the stair-stepping that results from drawing diagonal lines with discreet pixels. Many anti-aliasing algorithms employ intermediate colors to reduce the visual distinction of abrupt transitions, and such intermediate colors may thwart algorithms based on the premise of text composed of a single color value.

Here the concepts of the previous method apply, with the difference being that the previous method can replace a single pixel color value with a different color value, but this method can replace a group of pixel color values centered on or near the original pixel.

For example, where a single pixel having the selected pixel color value associated thereto, this pixel and all adjacent pixels can be replaced with a designated color, for example a 3×3 pixel square can be replaced.

According to another example, the replacement group can be chosen to be a rectangle whose dimensions are chosen randomly, often within predefined limits.

According to another example, the replacement group can be a non-rectangular shape whose shape and dimensions may be predefined, chosen randomly, or chosen to another algorithm or criteria.

And, according to another example, the replacement group may not be "solid", but rather be a pattern. In this example, the replacement pattern is designed to effectively redact information using a specified design of replacement pixel or modified pixel color values.

According to another method the identification of a pixel having the selected color value can result in the replacement of entire areas. According to this method, when replacement is designed to react to selected background color for exclusion (for example, a field where a social security number may be displayed) the perimeter of the field may be determined quickly and the entire area replaced with another color, color block or pattern.

According to another method for redacting selected image data the pixel color value is modified based on identification of a selected color, characters can be replaced. This method uses character recognition (analogous to Optical Character Recognition, or OCR, but working directly on the pixel data) when pixels with a color selected for exclusion are found. When the character, line of characters, or block of characters is determined to contain instances of the color selected for exclusion, the entire text area is replaced by a color or pattern.

According to the teachings disclosed herein any of the methods for creating redacted image data where pixels are excluded to remove sensitive data can be used in various variations and/or combinations thereof.

Business applications can control their use of colors. Thus, fields in business applications where restricted data may be displayed may be displayed in a foreground color value or background color which has been configured by the screen recorder to be excluded. One example is to display most text in black, and display fields for sensitive data in near-black.

The use of a subtle variation for a selected color as a "near color" to a text color has many advantages. For example, an agent will most likely not be distracted by the slight variation. Moreover, other pictures or video present on the screen during the snapshot can be rendered in a manner likely to be unobjectionable or unnoticed by the reviewer.

Snapshot-to-snapshot optimizations include instances where many screen snapshots will show little change from the previous one, and in such cases the color replacement actions may be repeated. Thus for a given frame, all information of the detection and replacement of selected colors in the frame may be retained for possible use by the next snapshot. The subsequent snapshot may be compared for overall similarity and may apply the same replacements if found to be similar. After the one or more selected pixels are modified of the recorded image data to automatically exclude information from the recorded image data thereby creating redacted image data, the supervisor is allowed to review the redacted data (510), which can be played back in movie-like fashion to the supervisor. For example, the output may be rendered to a commonly-available format (such as MPEG-2, MPEG-4, or MVI) before streaming to a compatible player on the supervisor workstation. The output may also be streamed in a proprietary format to software on the supervisor workstation. For example, the receiver software may render the redacted data output to a common format and forward the results to a commonly-available player; or perform the role of player, and render the results directly to the screen. The redacted image data can be stored prior to the display to the supervisor 510 or after the display to the supervisor. The display to the supervisor can also occur in substantially "real-time" with the interaction of the agent with the contact so that the supervisor can review what the agent says, sees, and how the agent interacts with the contact giving the agent immediate and on the spot feedback while the agent is interacting with the contact.

The embodiments described herein may include the use of a special purpose or general-purpose computer including various computer hardware or software modules, as discussed in greater detail below.

Embodiments within the scope of the present invention also include tangible computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

Figure 6:
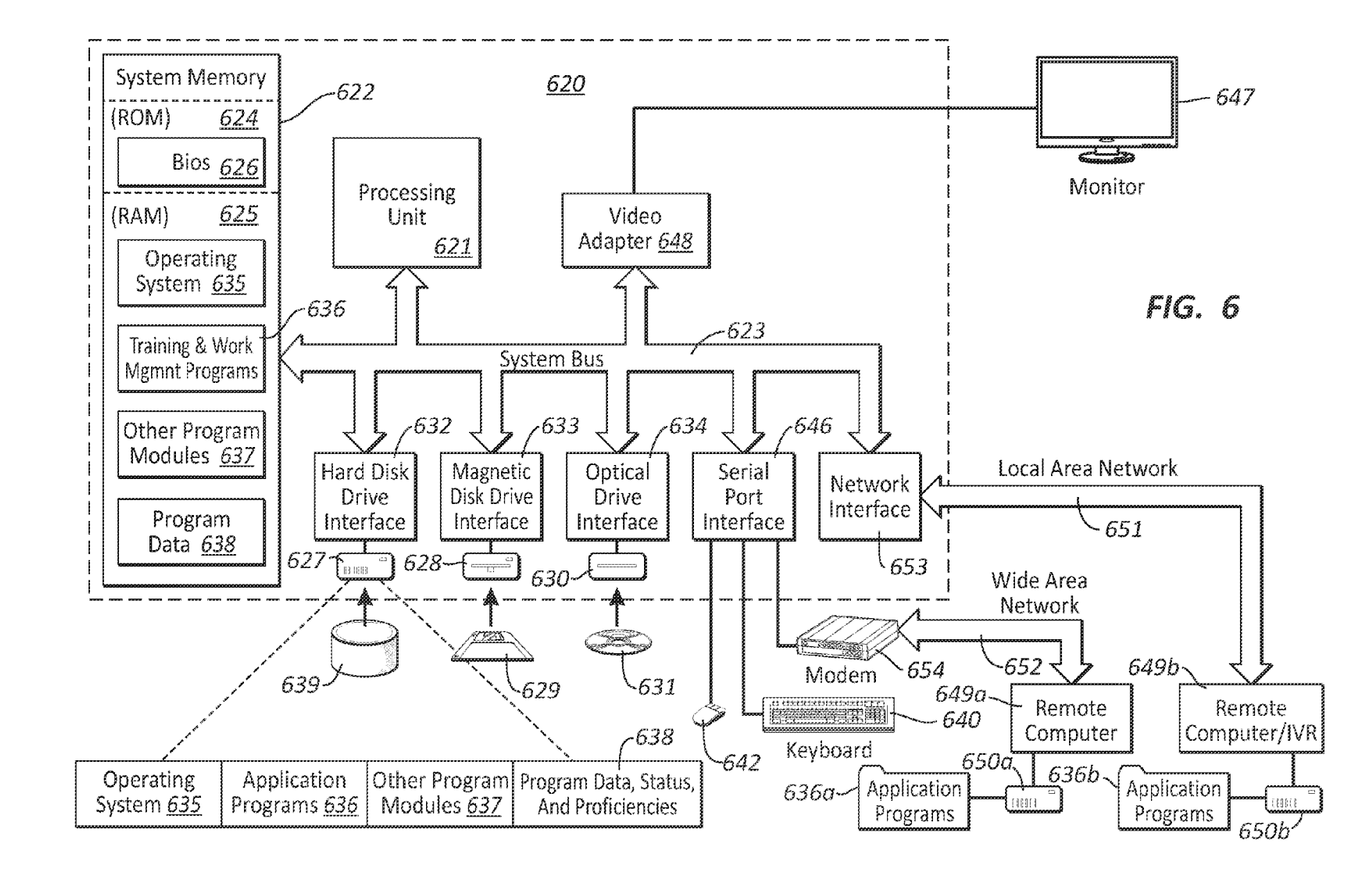
FIG. 6 provides a brief, general description of a suitable computing environment in which several embodiments may be implemented.

FIG. 6 and the following discussion are intended to provide a brief, general description of a suitable computing environment in which several embodiments may be implemented. For example FIG. 6 may illustrate an example of various components of a agent's workstation that operates a screen recorder, a supervisor's workstation, and/or a control server, media server, ACD, or other computer. FIG. 6 can also illustrate a means and steps for accomplishing various functionality and acts disclosed herein. For example, FIG. 6 as a specially programmed computer can illustrate a means for recording image data to an agent, means for modifying pixels of the recorded image data to create redacted image data and/or means for displaying redacted image data to a supervisor as well as other acts and algorithms disclosed herein. Although not required, several embodiments will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps disclosed herein.

Those skilled in the art will appreciate that the embodiments illustrated herein may be practiced in network computing environments with many types of computer system configurations, including personal computers, hand-held devices, multi-processor systems, microprocessor-based or programmable consumer electronics, network PCs, minicomputers, mainframe computers, and the like. Several embodiments may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 6, an example of a work and training management system for implementing several embodiments is illustrated, which includes a general purpose computing device in the form of a conventional computer 620, including a processing unit 621, a system memory 622, and a system bus 623 that couples various system components including the system memory 622 to the processing unit 621. The system bus 623 may be any of several types of bus structures including a memory bus or memory controller, a peripheral bus, and a local bus using any of a variety of bus architectures. The system memory includes read only memory (ROM) 624 and random access memory (RAM) 625. A basic input/output system (BIOS) 626, containing the basic routines that help transfer information between elements within the computer 620, such as during start-up, may be stored in ROM 624. Such components, or similar components, may also embody a workstation for a company representative.

The computer 620 may also include a magnetic hard disk drive 627 for reading from and writing to a magnetic hard disk 639, a magnetic disk drive 628 for reading from or writing to a removable magnetic disk 629, and an optical disk drive 630 for reading from or writing to removable optical disk 631 such as a CD-ROM, DVD, or other optical media. The magnetic hard disk drive 627, magnetic disk drive 628, and optical disk drive 630 are connected to the system bus 623 by a hard disk drive interface 632, a magnetic disk drive-interface 633, and an optical drive interface 634, respectively. The drives and their associated computer-readable media provide nonvolatile storage of computer-executable instructions, data structures, program modules and other data for the computer 620. Although the environment described herein employs a magnetic hard disk 639, a removable magnetic disk 629 and a removable optical disk 631, other types of computer readable media for storing data can be used, including magnetic cassettes, flash memory cards, digital versatile disks, Bernoulli cartridges, RAMs, ROMs, millipede memory, and the like.

Program code means comprising one or more program modules may be stored on the hard disk 639, magnetic disk 629, optical disk 631, ROM 624 or RAM 625, including an operating system 635, one or more training and work management programs 636, other program modules 637, and program data 638, such as company representative proficiencies and status. A user may enter commands and information into the computer 620 through keyboard 640, pointing device 642, or other input devices (not shown), such as a microphone, joy stick, game pad, satellite dish, scanner, or the like. These and other input devices are often connected to the processing unit 621 through a serial port interface 646 coupled to system bus 623. Alternatively, the input devices may be connected by other interfaces, such as a parallel port, a game port, or a universal serial bus (USB). A monitor 647 or another display device is also connected to system bus 623 via an interface, such as video adapter 648. In addition to the monitor, personal computers typically include other peripheral output devices (not shown), such as speakers and printers.

The computer 620 may operate in a networked environment using logical connections to one or more remote computers, such as remote computers 649a and 649b. Remote computers 649a and 649b may each be another personal computer, a server, a router, a network PC, workstations of company representatives, a peer device or other common network node, and typically include many or all of the elements described above relative to the computer 620, although only memory storage devices 650a and 650b and their associated application programs 636a and 636b have been illustrated in FIG. 6. The logical connections depicted in FIG. 6 include a LAN 651 and a WAN 652 that are presented here by way of example and not limitation. Such networking environments are commonplace in office-wide or enterprise-wide computer networks, intranets and the Internet.

When used in a LAN networking environment, the computer 620 is connected to the local network 651 through a network interface or adapter 653. When used in a WAN networking environment, the computer 620 may include a modem 654, a wireless link, or other means for establishing communications over the wide area network 652, such as the Internet. The modem 654, which may be internal or external, is connected to the system bus 623 via the serial port interface 646. In a networked environment, program modules depicted relative to the computer 620, or portions thereof, may be stored in the remote memory storage device. It will be appreciated that the network connections shown are exemplary and other means of establishing communications over wide area network 652 for real-time training, routing of work, and adjustment of incentives.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a contact handling system, a method for redacting selected image data that is later used for monitoring activity of an authorized agent responding to contact media, comprising:

displaying image data to the authorized agent on a visual display during an interaction between the authorized agent and a customer associated with the contact media, displaying the image data including:

displaying non-sensitive data associated with first pixels having a first color represented by a first set of color-component-intensity values; and displaying sensitive data associated with second pixels having a near-color different from the first color, the near-color represented by a second set of color-component-intensity values, wherein:

each color-component-intensity value of the first set of color-component-intensity values and the second set of color-component-intensity values represents an intensity of an associated color component, at least one of the color-component-intensity values of the first set of color-component-intensity values differs from an associated color-component-intensity value of the second set of color-component-intensity values by one, such that the first color cannot be the same as the near-color, and none of the color-component-intensity values of the first set of color-component-intensity values differs from the associated color-component-intensity value of the second set of color-component-intensity values by more than one;

recording the image data displayed to the authorized agent on the visual display during the interaction between the authorized agent and the customer associated with the contact media;

selecting one or more pixels of the recorded image data associated with the sensitive data, the one or more selected pixels identified at least in part via determining that the selected pixels are associated with the near-color;

modifying the one or more selected pixels of the recorded image data to obscure the sensitive data in the recorded image data thereby creating redacted image data; and displaying the redacted image data to an unauthorized supervisor to monitor the activity of the authorized agent.

2. A method according to claim 1, wherein the contact handling system includes:

a media server, which handles connection paths for contact media;

an automatic contact distributor, which tracks a state of each contact and agent, supplying idle agents with waiting contact media;

an interactive voice response unit, which provides pre-recorded audio prompts to incoming voice contact media;

storage for storing redacted data received from an agent workstation along with other electronic files; and a contact handling network connected to telephony and/or outside packet-based network.

3. A method according to claim 1, wherein each of the one or more selected pixels is automatically modified to have a designated color based at least in part on an adjacent pixel having a different color relative to the one or more selected pixels.

4. A method according to claim 1, wherein the first set of color-component-intensity values and the second set of color-component-intensity values each include a concatenation of three eight-bit bytes, a first of the eight-bit bytes representing a red color-component intensity, a second of the eight-bit bytes representing a green color-component intensity, and a third of the eight-bit bytes representing a blue color-component intensity, and wherein the second set of color-component-intensity values is equal to 0x000100 or 0x000001 in hexadecimal notation and the first set of color-component-intensity values is equal to 0x000000 in hexadecimal notation.

5. A method according to claim 1, wherein each of the one or more selected pixels, as well as adjacent pixels that are positioned adjacent to each of the one or more selected pixels, are automatically modified to have a designated color.

6. A method according to claim 5, wherein the adjacent pixels are automatically modified to have the designated color in addition to each of the one or more selected pixels to compensate for anti-aliased fonts.

7. A method according to claim 1, wherein a 3-pixel-by-3-pixel square surrounding each of the one or more selected pixels is automatically modified to have a designated color.

8. A method according to claim 1, wherein pixel groups surrounding each of the one or more selected pixels are automatically modified to have a designated color, the pixel groups having a shape of a rectangle, a shape of a predetermined pattern, or a shape of a predefined shape.

9. A method according to claim 1, further comprising modifying pixels in an identified area to automatically exclude information within the identified area from the recorded image data thereby creating the redacted image data.

10. A method according to claim 9, wherein the identified area includes a field where at least some of the sensitive data is displayed to the authorized agent while the authorized agent interacts with the customer associated with the contact media.

11. A method according to claim 1, wherein the one or more selected pixels are part of a character, the method further comprising recognizing the character.

12. A method according to claim 11, the method further comprising recognizing the character along with other adjacent characters, a line of characters, or a block of characters and modifying the one or more selected pixels includes replacing a text area based at least in part on the character and the other adjacent characters.

13. A method according to claim 1, wherein:

the recording of the image data is performed by a screen recorder at a workstation of the authorized agent, and the modifying of the one or more selected pixels of the recorded image data to automatically exclude the sensitive data from the recorded image data is performed by the screen recorder as the image data is recorded.

14. A method according to claim 1, further comprising:

compressing the redacted image data; and encrypting the redacted image data.

15. A method according to claim 1, wherein the redacted image data is transmitted to a media server in the contact handling system as a redacted video stream, the media server receiving the redacted video stream and combining the redacted video stream with other audio streams based on dynamic events including on/off hold, conferencing, and transfers.

16. A method according to claim 15, wherein the other audio streams include telephony audio.

17. A method according to claim 1, wherein the one or more selected pixels of a first recorded image data for exclusion are used to identify one or more pixels of a second recorded image data for exclusion.

18. A method according to claim 1, wherein the sensitive data is associated with a background including the near-color and the one or more selected pixels are associated with a foreground color different from both the first color and the near-color.

19. A method according to claim 1, wherein the sensitive data is associated with characters including the near-color.

20. A non-transitory computer readable medium having computer executable instructions stored thereon for performing the method of claim 1.

21. A contact handling system comprising:
an agent workstation comprising:
an electronic processor;
a computer readable medium having executable instructions stored thereon for performing the following method:
displaying image data to an agent on a visual display during an interaction between the agent and a customer associated with contact media, displaying the image data including:
displaying non-sensitive data including first pixels having a first color represented by a first set of color-component-intensity byte values; and
displaying sensitive data including second pixels having a near-color different from the first color, the near-color represented by a second set of the color-component-intensity byte values, wherein:
each of the color-component-intensity byte values of the first set of the color-component-intensity byte values and the second set of the color-component-intensity byte values represents an intensity of an associated color component,
at least one of the color-component-intensity byte values of the first set of the color-component-intensity byte values differs from an associated color-component-intensity byte value of the second set of the color-component-intensity byte values by one, such that the first color cannot be the same as the near-color, and
none of the color-component-intensity byte values of the first set of color-component-intensity byte values differs from the associated color-component-intensity byte value of the second set of color-component-intensity byte values by more than one;
recording the image data displayed to the agent on the visual display during the interaction between the agent and the customer associated with the contact media;
selecting one or more pixels of the recorded image data associated with the sensitive data, the one or more selected pixels identified at least in part via determining that the selected pixels are associated with the near-color;
modifying the one or more selected pixels of the recorded image data to obscure the sensitive data in the recorded image data thereby creating redacted image data; and
displaying the redacted image data to a supervisor to monitor activity of the agent,
wherein the agent is authorized to view the sensitive data and the supervisor is not authorized to view the sensitive data.

22. A contact handling system according to claim 21, further comprising:
a media server, which handles connection paths for contact media;
an automatic contact distributor, which tracks a state of each contact and agent, supplying idle agents with waiting contact media;
an interactive voice response unit, which provides pre-recorded audio prompts to incoming voice contact media;
storage for storing redacted data received from the agent workstation along with other files; and
a contact handling network connected to telephony and/or outside packet-based network.

23. A contact handling system according to claim 22, wherein the at least one of the media server, automatic contact distributor and interactive voice response unit is hosted by a cloud network remote from the agent workstation.

24. In a media server of a contact handling system, a method for monitoring the activity of an agent responding to contact media, comprising:
tracking a contact status of a telephony contact in the contact handling system;
displaying image data to the agent on a visual display during an interaction between the agent and a customer associated with contact media, the image data associated with sensitive data and non-sensitive data, the non-sensitive data including first pixels having a first color represented by a first set of color-component-intensity values, and the sensitive data associated with second pixels having a near-color different from the first color, the near-color represented by a second set of color-component-intensity values, wherein at least one of the color-component-intensity values of the second set of color-component-intensity values differs from an associated one of the color-component-intensity values of the first set of color-component-intensity values by one, such that the first color cannot be the same as the near-color, and none of the color-component-intensity values of the second set of color-component-intensity values differs from the associated color-component-intensity value of the first set of color-component-intensity values by more than one;
recording the image data displayed to the agent on the visual display during the interaction between the agent and the customer associated with the contact media;
selecting one or more pixels of the recorded image data associated with the sensitive data, the one or more selected pixels identified at least in part via determining that the selected pixels are associated with the near-color;
modifying the one or more selected pixels of the recorded image data to automatically exclude the sensitive data from the recorded image data thereby creating redacted image data;
recording audio of the agent and the telephony contact during the interaction; and combining the redacted image data and the recorded audio into a video stream file for review by a supervisor of the agent, wherein the agent is authorized to view the sensitive data and the supervisor is not authorized to view the sensitive data.

25. A method according to claim 24, wherein the first set of color-component-intensity values and the second set of color-component-intensity values each include a concatenation of three eight-bit, a first of the eight-bit bytes representing a red color-component intensity, a second of the eight-bit bytes representing a green color-component intensity, and a third of the eight-bit bytes representing a blue color-component intensity, and wherein the second set of color-component-intensity values is equal to 0x000100 or 0x000001 in hexadecimal notation and the first set of color-component-intensity values is equal to 0x000000 in hexadecimal notation.

* * * * *